(12) United States Patent
Jung

(10) Patent No.: US 9,819,254 B2
(45) Date of Patent: Nov. 14, 2017

(54) VOICE COIL MOTOR

(71) Applicant: LG INNOTEK CO., LTD., Seoul (KR)

(72) Inventor: Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 292 days.

(21) Appl. No.: 14/419,780

(22) PCT Filed: Jun. 26, 2013

(86) PCT No.: PCT/KR2013/005624
§ 371 (c)(1),
(2) Date: Feb. 5, 2015

(87) PCT Pub. No.: WO2014/035038
PCT Pub. Date: Mar. 6, 2014

(65) Prior Publication Data
US 2015/0207393 A1 Jul. 23, 2015

(30) Foreign Application Priority Data
Sep. 3, 2012 (KR) .................. 10-2012-0097323

(51) Int. Cl.
H02K 41/03 (2006.01)
H02K 41/035 (2006.01)
(Continued)

(52) U.S. Cl.
CPC ........... *H02K 41/0356* (2013.01); *G02B 7/08* (2013.01); *G03B 3/10* (2013.01); *G03B 2205/0069* (2013.01)

(58) Field of Classification Search
CPC ..................................... G02B 7/08; G03B 3/10
(Continued)

(56) References Cited

U.S. PATENT DOCUMENTS

2011/0291495 A1* 12/2011 Lee .................... H02K 41/0356
310/12.16
2012/0008220 A1* 1/2012 Lee .......................... G03B 3/10
359/822

(Continued)

FOREIGN PATENT DOCUMENTS

JP 2008-281820 A 11/2008
KR WO2010095853 * 8/2010 ............. H02K 33/02
(Continued)

OTHER PUBLICATIONS

European Search Report dated May 3, 2016 issued in Application No. 13833363.8.

(Continued)

*Primary Examiner* — Terrance Kenerly
(74) *Attorney, Agent, or Firm* — KED & Associates, LLP

(57) ABSTRACT

The VCM according to an exemplary embodiment of the present disclosure includes a base unit, a mover including a bobbin arranged at an upper surface of the base unit and formed with a plurality of rotation prevention units along a periphery and a first driving unit arranged at a periphery of the bobbin, a stator including a yoke configured to the base unit to surround the mover and inner yoke units each extended to between the rotation prevention units, and a second driving unit oppositely arranged to the first driving unit, and an elastic member elastically supporting the mover, wherein an object occurrence preventing portion is formed between the rotation prevention unit and the inner yoke units to decrease a contact area between the rotation prevention unit and the inner yoke units.

20 Claims, 2 Drawing Sheets

(51) Int. Cl.
*G02B 7/08* (2006.01)
*G03B 3/10* (2006.01)

(58) Field of Classification Search
USPC ...................................................... 310/12.16
See application file for complete search history.

(56) References Cited

U.S. PATENT DOCUMENTS

| 2012/0008221 A1* | 1/2012 | Min | H02K 41/0356 |
| | | | 359/824 |
| 2012/0146432 A1* | 6/2012 | Kim | G02B 7/08 |
| | | | 310/12.16 |
| 2014/0092494 A1* | 4/2014 | Min | G02B 7/022 |
| | | | 359/824 |

FOREIGN PATENT DOCUMENTS

| KR | 10-2011-0058582 A | 6/2011 |
| KR | 10-2011-0111624 A | 10/2011 |
| KR | 10-2012-0065492 A | 6/2012 |
| KR | 10-2012-0065493 A | 6/2012 |

OTHER PUBLICATIONS

International Search Report dated Sep. 2, 2013 issued in Application No. PCT/KR2013/005624.

* cited by examiner

[Fig. 1]
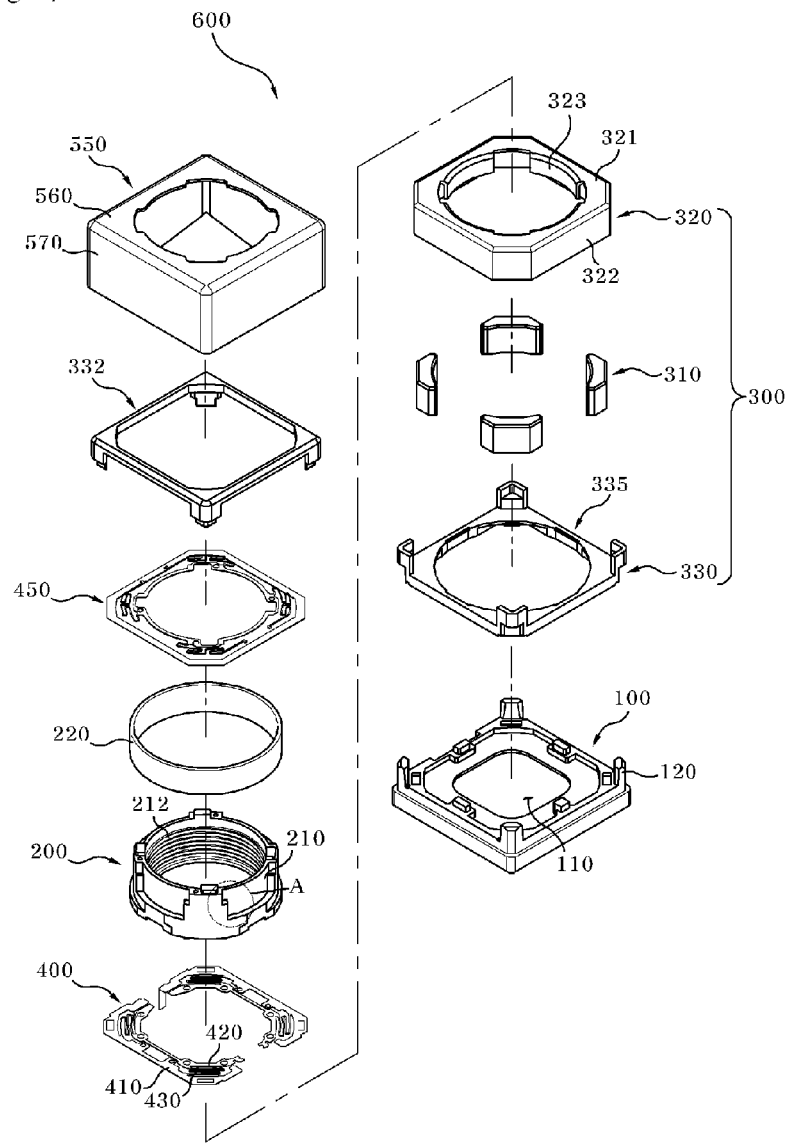
[Fig. 2]
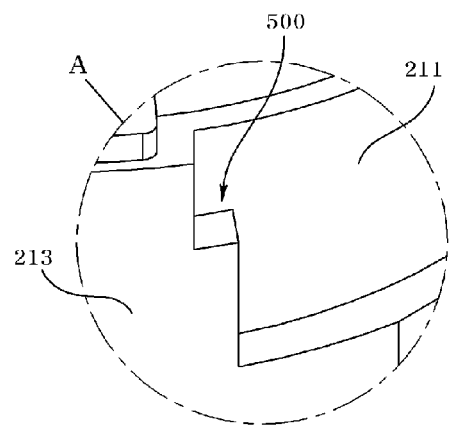

[Fig. 3]
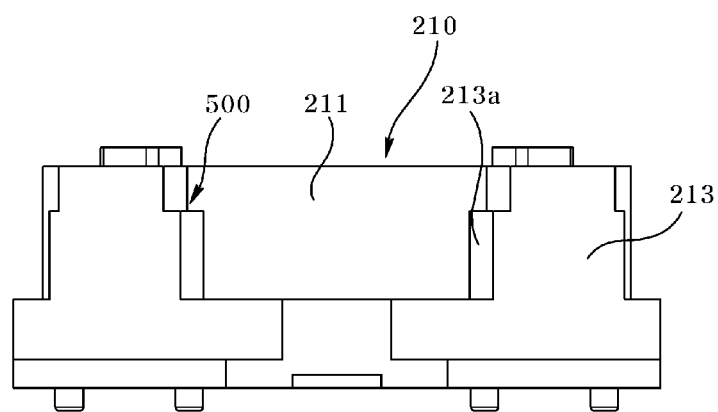
[Fig. 4]
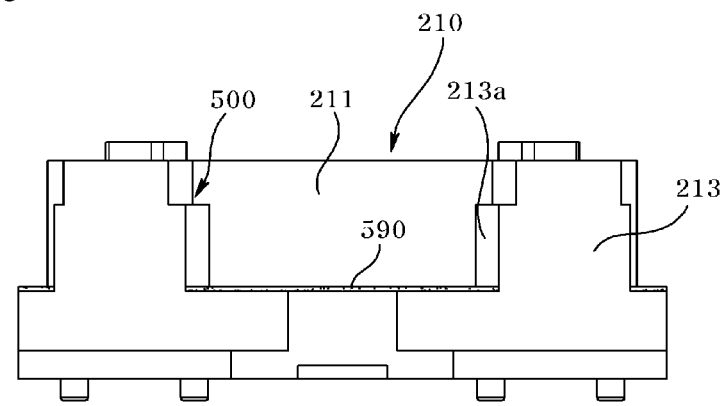

VOICE COIL MOTOR

CROSS-REFERENCE TO RELATED PATENT APPLICATIONS

This application is a U.S National Stage Application under 35 U.S.C. §371 of PCT Application No. PCT/KR2013/005624, filed Jun. 26, 2013, which claims priority to Korean Patent Application No. 10-2012-0097323, filed Sep. 3, 2012, whose entire disclosures are hereby incorporated by reference.

TECHNICAL FIELD

The teachings in accordance with exemplary and non-limiting embodiments of this disclosure relate generally to a VCM.

BACKGROUND ART

Recently, mobile communication devices such as mobile phones, game machines and tablet PCs are mounted with camera modules including image sensors capable of storing an object in a digital still image or a video image.

A conventional camera module suffers from disadvantages in that that it is difficult to adjust a gap between an image sensor and a lens arranged at a front surface of the image sensor, and it is also difficult to accurately adjust a focus on an object, resulting in an image quality degradation of the digital image or video.

Concomitant with a recent development of a VCM (Voice Coil Motor), a gap between a lens and an image sensor can be adjusted to obtain an excellent digital image or a video. In order to drive a VCM, the VCM includes a stator including a magnet an a yoke, a rotor including a coil block arranged inside the stator and arranged at a periphery of a bobbin mounted with a lens to generate an electromagnetic force in response to a driving current applied from an outside, and a cover arranged at the stator to cover the rotor.

The conventional VCM however suffers from disadvantages in that, although a portion of a bobbin is hitched at a yoke to prevent the bobbin from rotating abnormally, the bobbin contacted to the yoke allows the bobbin to generate particles such as fine dust or fine objects, and the fine objects are in turn collected at an IR (Infrared) filter arranged at a bottom surface of the bobbin to deteriorate a display quality of an image or a video.

DISCLOSURE

Technical Problem

The present disclosure is to provide a VCM configured to decrease or inhibit generation of objects from a bobbin in a case a yoke and the bobbin are contacted, whereby a display quality degradation of an image or a video can be prevented.

Technical problems to be solved by the present disclosure are not restricted to the above-mentioned descriptions, and any other technical problems not mentioned so far will be clearly appreciated from the following description by skilled in the art.

Technical Solution

In one exemplary embodiment of the present disclosure, there is provided a VCM, the VCM comprising: a base unit, a mover including a bobbin arranged at an upper surface of the base unit and formed with a plurality of rotation prevention units along a periphery and a first driving unit arranged at a periphery of the bobbin, a stator including a yoke configured to the base unit to surround the mover and inner yoke units each extended to between the rotation prevention units, and a second driving unit oppositely arranged to the first driving unit, and an elastic member elastically supporting the mover, wherein an object occurrence preventing portion is formed between the rotation prevention unit and the inner yoke units to decrease a contact area between the rotation prevention unit and the inner yoke units.

Advantageous Effects

A VCM according to an exemplary embodiment of the present disclosure has an advantageous effect in that a contact area between a rotation prevention unit of a bobbin and an inner yoke unit of a yoke contacting the rotation prevention unit of the bobbin is reduced to decrease or inhibit generation of objects generated from the rotation prevention unit when the rotation prevention unit of the bobbin and the inner yoke unit are brought into contact, whereby quality degradation of an image or a video can be prevented.

DESCRIPTION OF DRAWINGS

FIG. 1 is a cross-sectional view illustrating a VCM according to an exemplary embodiment of the present disclosure.

FIG. 2 is an enlarged view of 'A' of FIG. 1.

FIG. 3 is a lateral view of a bobbin of FIG. 1.

FIG. 4 is a perspective view illustrating a bobbin according to another exemplary embodiment of the present disclosure.

BEST MODE

The disclosed exemplary embodiments and advantages thereof are best understood by referring to the accompanying drawings. Like numbers refer to like elements throughout. In the figures, certain layers, sizes, shapes, components or features may be exaggerated for clarity and convenience.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

FIG. 1 is a cross-sectional view illustrating a VCM according to an exemplary embodiment of the present disclosure, FIG. 2 is an enlarged view of 'A' of FIG. 1, and FIG. 3 is a lateral view of a bobbin of FIG. 1.

Referring to FIGS. 1, 2 and 3, a VCM (600) includes a base unit (100), a mover (200), a stator (300), an elastic member (400) and an object occurrence preventing portion (500).

The base unit (100) takes a shape of a cubic plate, and is centrally formed with a through hole (110) passing through an upper surface of the base unit (100) and a bottom surface opposite to the upper surface. Each of four corners formed on the upper surface of the base unit (100) is coupled to a coupling pillar (120), where the coupling pillar (120) is coupled to a spacer (330, described later). The mover (200) includes a bobbin (210) and a first driving unit (220).

The bobbin (210) takes a shape of a cylinder opened at an upper surface and a bottom surface, and may be formed at an inner surface with a female screw unit (212) for mounting at least one cylindrical lens. The bobbin (210) is protrusively formed at a periphery (211) with a plurality of rotation prevention units (213) along the periphery (211) of the bobbin (210), where four rotation prevention units (213) may be formed along the periphery (211) of the bobbin (210), each spaced apart at a predetermined distance.

The rotation prevention units (213) prevent the rotation of the bobbin (210) by being hitched by an inner yoke portion (323) of a yoke (320, described later).

Although the exemplary embodiment of the present disclosure has described a plurality of rotation prevention units (213) protruded from the periphery (211) of the bobbin (210) each spaced apart at a predetermined distance, alternatively, it should be apparent that each of the rotation prevention units (213) formed on the bobbin 210) may take a recess shape concaved from the periphery (211) of the bobbin (210).

The first driving unit (220) is formed by winding a long wire insulated by an insulating resin, and may be bonded to a surface of the rotation prevention unit (213) of the bobbin (210) using an adhesive. The stator (300) includes a second driving unit (310) and a yoke (320). In addition, the stator (300) may include a spacer (330).

In the exemplary embodiment of the present disclosure, the second driving unit (310) is arranged at an outside of the first driving unit (220). The second driving unit (310) is arranged opposite to the first driving unit (220). The second driving unit (310) includes four magnets in a shape of a pillar, for example, and the four pillar-like magnets are formed about the first driving unit (220), each spaced apart at a predetermined distance.

The yoke (320) is formed in a shape of a square plate, and includes a yoke upper plate (321) centrally formed with a round opening and yoke lateral plates (322) extended from four edges of the yoke upper plate (321) to wrap the mover (100). Each of inner corners formed by a pair of adjacent yoke lateral plates (322) is arranged with the second driving unit (310). The yoke upper plate (321) is formed with an inner yoke unit (323) extended from the opening of the yoke upper plate (321) to the rotation prevention units (213) of the bobbin (210).

The inner yoke unit (323) functions to prevent the bobbin (210) from rotating by being contacted to the rotation prevention unit (213) in a case the bobbin (210) is rotated by leakage of electromagnetic field generated by the first driving unit (220) and turning effect generated in a case a lens is mounted to the bobbin (210).

The elastic member (400) is arranged at a bottom surface of the bobbin (210) of the mover (200). In the exemplary embodiment of the present invention, the elastic member (400) may be formed in a pair, and each of the elastic members (400) is electrically insulated. The pair of elastic members (400) includes an inner elastic unit (410), an outer elastic unit (420) and a connection elastic unit (430).

The outer elastic unit (420), when seen in a top plan view, takes a shape of a bent strip, and is coupled to the coupling pillar (120) by being inserted into a pair of adjacent coupling pillars (120) of the base unit (100). The inner elastic unit (410) is arranged at a bottom surface of the bobbin (210). Thus, the inner elastic unit (410) takes a shape of a curved strip similar in shape to the bottom surface of the bobbin (210). The connection elastic unit (430), when seen in a top plan view, is formed in a zigzag shape to be connected to the inner and outer elastic units (410, 420).

Referring to FIG. 1 again, an upper surface opposite to the bottom surface of the bobbin (210) is arranged with an additional elastic member (450) elastically supporting the bobbin (210). The spacer (330) serves to fix the elastic member (400), the additional elastic member (450), the mover (200) and the stator (300). The spacer (330) includes an upper spacer (332) and a bottom spacer (335), where the upper and bottom spacers (332, 335) are meshed. The bottom spacer (335) is coupled to the coupling pillars (120) of the base unit (100). The outer elastic unit (420) of the elastic member (400) is fixed between the bottom spacer (335) and an upper surface of the base unit (100), and the additional elastic member (450) is fixed to a bottom surface of the upper spacer (332).

A cover (550) includes a cover upper plate (560) formed in a shape of a square plate having a round opening for exposing a lens and a cover lateral plate (570) extended from an edge of the cover upper plate (560). The cover lateral plate (570) is coupled to the base unit (100).

Referring to FIGS. 2 and 3, the bobbin (210) is applied with a turning effect in a case a lens is coupled to the bobbin (210), or the bobbin (210) vertically moves, and the bobbin (210) is horizontally rotated by the turning effect applied to the bobbin (210). At this time, in a case the bobbin (210) is rotated, the elastic member (400) and the additional elastic member (450) are deformed or twisted to twist an optical axis of the mover (200) or to generate a driving defect of the mover (200).

As noted from the foregoing, the rotation of bobbin (210) is prevented by the rotation prevention unit (213) formed at the periphery of the bobbin (210) and the inner yoke unit (323) of the yoke (320), where, in a case the inner yoke unit (323) and the rotation prevention unit (213) are brought into contact, a fine objects may be generated from the bobbin (210) which is a molded material, and the fine objects may drop to be introduced to an upper surface of an IR (Infrared) filter arranged at a rear surface of the base unit (100).

In a case the fine objects generated from the bobbin (210) are introduced to an upper surface of an IR (Infrared) filter, there may be generated a quality degradation of a digital image or a video due to the fine objects.

In the exemplary embodiment of the present disclosure, the VCM (600) includes the object occurrence preventing portions (500) preventing generation of objects by contact between the rotation prevention unit (213) of the bobbin (210) and the inner yoke unit (323) of the yoke (320). The object occurrence preventing portions (500) reduce or inhibit, for example, a generated amount of fine objects from the rotation prevention unit (213) by reducing a contact area between the rotation prevention unit (213) of the bobbin (210) and the inner yoke unit (3230 of the yoke (320). The object occurrence preventing portion (500) is formed at each lateral surface (213a) of the rotation prevention unit (213) opposite to both lateral surfaces of the inner yoke unit (323) and contacting the inner yoke unit (323).

Particularly, the object occurrence preventing portion (500) formed on the lateral surfaces (213a) opposite to both lateral surfaces of the inner yoke unit (323) is formed in a shape of a staircase extended outwardly from the rotation prevention unit (213) for reducing the generated amount of fine objects from the rotation prevention unit (213).

To be more specific, in a case the both lateral surfaces of the inner yoke unit (323) are formed in a shape of a straight line, a first gap is formed between the lateral surfaces of the rotation prevention unit (213) and the lateral surfaces of the inner yoke unit (323), and a second gap greater than the first gap is formed between the lateral surfaces of the object occurrence preventing portion (500) and the inner yoke unit (323).

Hence, in a case the bobbin (210) is rotated, the lateral surfaces of the inner yoke unit (323) are brought into contact with each lateral surface (213a) of the area-reduced rotation prevention unit (213), whereby the generated amount of objects can be reduced or inhibited by the rotation prevention unit (213). Furthermore, in view of the fact that the bobbin (210) is injection-molded, the object occurrence preventing portion (500) may be formed at a predetermined depth from an upper surface of the bobbin (210).

Meanwhile, in a case the object occurrence preventing portion (500) is formed using an injection molding method, albeit being difficult, the object occurrence preventing portion (500) may be intermittently formed with at least two rotation prevention units (213) in order to reduce a contact area between the rotation prevention unit (213) of the bobbin (210) and the inner yoke unit (323).

Now, referring to FIG. 4, even if the amount of objects generated by contact between the rotation prevention unit (213) and the inner yoke unit (323) in response to the rotation of bobbin (210) may be reduced or inhibited by the object occurrence preventing portion (500), a small amount of objects can be generated, such that, in the exemplary embodiment of the present disclosure, an object collecting member (590) may be formed at a floor surface of a groove formed by the rotation prevention unit (213) in order to prevent a small amount of objects generated from the rotation prevention unit (213) from entering the IR filter.

The object collecting member (590) may include a synthetic resin, for example, having a sufficient viscosity for collecting the foreign objects. The object collecting member (590) may include an epoxy resin having a viscosity.

Although the exemplary embodiment of the present disclosure has described and explained the reduction or inhibition of fine objects of the rotation prevention unit (213) of the bobbin (210) by forming a recess-shaped object occurrence preventing portion (500) on the rotation prevention unit (213) of the bobbin (210), alternatively, a portion of the inner yoke unit (323) of the yoke (320) opposite to the rotation prevention unit (213) may be cut to reduce a contact area with the rotation prevention unit (213). Furthermore, in a case an object occurrence preventing portion is formed at a lateral surface of the inner yoke unit (323), a plurality of object occurrence preventing portions may be intermittently formed along the lateral surface of the inner yoke unit (323).

As apparent from the foregoing, a contact area between a rotation prevention unit of a bobbin and an inner yoke unit of a yoke contacting the rotation prevention unit of the bobbin is reduced to decrease or inhibit generation of objects generated from the rotation prevention unit when the rotation prevention unit of the bobbin and the inner yoke unit are brought into contact, whereby quality degradation of an image or a video can be prevented.

The previous description of the present disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to limit the examples described herein, but is to be accorded the widest scope consistent with the principles and novel features disclosed herein.

The invention claimed is:

1. A Voice Coil Motor (VCM) comprising:
   a base;
   a mover including a bobbin disposed on the base and formed with a plurality of rotation prevention units provided on a periphery of the bobbin and a first driving unit arranged at the plurality of rotation prevention units of the bobbin, wherein the plurality of rotation prevention units protrudes from the periphery of the bobbin;
   a stator including a yoke configured to surround the mover and including inner yoke units each extending to between the rotation prevention units, and a second driving unit oppositely arranged to the first driving unit; and
   an elastic member arranged on an upper surface of the bobbin and supporting the bobbin,
   wherein the rotation prevention unit comprises a lateral surface contacting with the inner yoke unit when the bobbin is rotated and an upper area connecting with the lateral surface,
   wherein a gap is formed between the upper area of the rotation prevention unit and the upper surface of the bobbin to decrease a contact area between the rotation prevention unit and the inner yoke units,
   wherein a lateral surface of the inner yoke unit comprises a first portion corresponding to the gap and a second portion facing the rotation prevention unit, and
   wherein when the bobbin is rotated, the second portion of the lateral surface of the inner yoke unit is configured to be brought into contact with the rotation prevention unit and the first portion of the lateral surface of the inner yoke unit does not contact with the rotation prevention unit, and
   wherein the first driving unit includes any one of a coil and a magnet, and the second driving unit includes any remaining one of the coil and the magnet.

2. The VCM of claim 1, wherein the gap is formed by a groove formed at the lateral surface of the rotation prevention unit opposite to the lateral surface of the inner yoke unit, and
   wherein the rotation prevention unit comprises a staircase shape.

3. The VCM of claim 2, wherein a first gap is formed between the lateral surface of the rotation prevention unit and the second portion of the lateral surface of the inner yoke unit in a horizontal direction, and a second gap greater than the first gap is formed between a surface of the groove facing the first portion of the lateral surface of the inner yoke unit in the horizontal direction.

4. The VCM of claim 1, further comprising an object collecting member at a floor surface of the groove of the rotation prevention unit, and
   wherein the object collecting member includes an epoxy resin having a viscosity.

5. The VCM of claim 1, wherein the inner yoke unit comprises a groove formed at the lateral surface of the inner yoke unit to decrease a contact area between the rotation prevention unit and the lateral surface of the inner yoke unit.

6. The VCM of claim 1, wherein the first portion of the lateral surface of the inner yoke unit is disposed on a same plane as the second portion of the lateral surface of the inner yoke unit.

7. The VCM of claim 1, wherein the plurality of rotation prevention units comprises four rotation prevention units and the inner yoke units comprise four inner yoke units.

8. A Voice Coil Motor (VCM) comprising:
a stator including a yoke and a magnet disposed on the yoke, wherein the yoke comprises an upper plate, a lateral plate extending from the upper plate, and an inner yoke unit extending from the upper plate;
a mover including a bobbin formed with a rotation prevention unit and a coil disposed on the rotation prevention unit of the bobbin, wherein the rotation prevention unit protrudes from a side surface of the bobbin;
an elastic member arranged on an upper surface of the bobbin and supporting the bobbin; and
a base disposed below the mover;
wherein the rotation prevention unit comprises a lateral surface configured to be brought into contact with the inner yoke unit when the bobbin is rotated and an upper area extending from the lateral surface,
wherein the upper area of the rotation prevention unit is spaced apart from the upper surface of the bobbin in an optical axis direction to decrease a contact area between the rotation prevention unit and the inner yoke unit.

9. The VCM of claim 8, wherein a lateral surface of the inner yoke unit comprises a first portion corresponding to a space between the upper surface of the bobbin and the upper area of the rotation prevention unit, and the first portion of the lateral surface of the inner yoke unit does not contact with the lateral surface of the rotation prevention unit.

10. The VCM of claim 9, wherein the lateral surface of the inner yoke unit further comprises a second portion facing the lateral surface of the rotation prevention unit, and the second portion of the lateral surface of the inner yoke unit is configured to be brought into contact with the lateral surface of the rotation prevention unit when the bobbin is rotated.

11. The VCM of claim 10, wherein the second portion of the lateral surface of the inner yoke unit is disposed below the first portion of the lateral surface of the inner yoke unit.

12. The VCM of claim 11, wherein in the optical axis direction, a length of the lateral surface of the rotation prevention unit is longer than a length of the first portion of the inner yoke unit corresponding to the space between the upper surface of the bobbin and the upper area of the rotation prevention unit.

13. The VCM of claim 11, wherein the second portion of the lateral surface of the inner yoke unit is disposed on the same plane as the first portion of the lateral surface of the inner yoke unit.

14. The VCM of claim 8, wherein a protrusion protrudes from the upper surface of the bobbin, and the elastic member comprises a shape corresponding to the protrusion of the bobbin.

15. The VCM of claim 8, wherein the inner yoke unit comprises a first inner yoke unit, a second inner yoke unit spaced apart from the first inner yoke unit, a third inner yoke unit disposed opposite to the first inner yoke unit and a fourth inner yoke unit disposed opposite to the second inner yoke unit,
wherein the rotation prevention unit comprises a first rotation prevention unit disposed between the first inner yoke unit and the second inner yoke unit and a second rotation prevention unit disposed between the second inner yoke unit and the third inner yoke unit, the third rotation prevention unit disposed between the third inner yoke unit and the fourth inner yoke unit, and the fourth rotation prevention unit disposed between the fourth inner yoke unit and the first inner yoke unit.

16. The VCM of claim 15, wherein the first inner yoke unit comprises a first lateral surface facing the first rotation prevention unit and a second lateral surface opposite to the first lateral surface and facing the fourth rotation prevention unit,
wherein the first lateral surface of the first inner yoke unit is parallel to the second lateral surface of the first inner yoke unit,
wherein the first lateral surface of the first inner yoke unit comprises a first portion corresponding to a space between the upper surface of the bobbin and the upper area of the first rotation prevention unit in the optical axis direction and a second portion facing the lateral surface of the first rotation prevention unit in a direction perpendicular to the optical axis direction and disposed below the first portion of the first lateral surface of the first inner yoke unit, and
wherein when the second portion of the first lateral surface of the first inner yoke unit contacts the first rotation prevention unit of the bobbin, the first portion of the first lateral surface of the first inner yoke unit is configured not to contact the first rotation prevention unit of the bobbin.

17. The VCM of claim 16, wherein the second lateral surface of the first inner yoke unit comprises a first portion corresponding to a space between the upper surface of the bobbin and the upper area of the fourth rotation prevention unit in the optical axis and a second portion facing the lateral surface of the fourth rotation prevention unit in the direction perpendicular to the optical axis direction and disposed below the first portion of the second lateral surface of the first inner yoke unit, and
wherein when the second portion of the second lateral surface of the first inner yoke unit contacts the fourth rotation prevention unit of the bobbin, the first portion of the second lateral surface of the first inner yoke unit is configured not to contact the fourth rotation prevention unit of the bobbin.

18. The VCM of claim 8, wherein the rotation prevention unit of the bobbin is configured to be hitched by the inner yoke unit to prevent rotation of the bobbin.

19. The VCM of claim 8, further comprising a cover surrounding the stator and the mover and coupled to the base.

20. A camera module comprising:
the VCM of claim 8;
a lens coupled to the bobbin; and
an image sensor, wherein the bobbin comprises a screw unit for coupling the lens.

* * * * *